United States Patent
Harada et al.

(10) Patent No.: US 10,051,490 B2
(45) Date of Patent: Aug. 14, 2018

(54) DETERMINATION APPARATUS FOR DETERMINING COMMUNICATION AVAILABILITY AND DETERMINATION METHOD

(71) Applicant: NTT DOCOMO, INC., Chiyoda-ku (JP)

(72) Inventors: Hiroki Harada, Chiyoda-ku (JP); Hidetoshi Kayama, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 58 days.

(21) Appl. No.: 14/372,576

(22) PCT Filed: Feb. 20, 2013

(86) PCT No.: PCT/JP2013/054226
§ 371 (c)(1),
(2) Date: Jul. 16, 2014

(87) PCT Pub. No.: WO2013/140930
PCT Pub. Date: Sep. 26, 2013

(65) Prior Publication Data
US 2014/0362721 A1    Dec. 11, 2014

(30) Foreign Application Priority Data

Mar. 22, 2012 (JP) .................... 2012-066269

(51) Int. Cl.
*H04W 24/02* (2009.01)
*H04W 52/24* (2009.01)
(Continued)

(52) U.S. Cl.
CPC .......... *H04W 24/02* (2013.01); *H04L 5/0023* (2013.01); *H04L 5/0048* (2013.01);
(Continued)

(58) Field of Classification Search
CPC ... H04L 27/261; H04L 5/0007; H04L 5/0048; H04W 28/06; H04W 88/00
See application file for complete search history.

(56) References Cited

U.S. PATENT DOCUMENTS 7,864,884 B2 * 1/2011 Jansen ................ H04L 27/2675
370/343
2006/0209746 A1 9/2006 Asai et al.
(Continued)

FOREIGN PATENT DOCUMENTS

CN    101018087 A    8/2007
CN    102047749 A    5/2011
(Continued)

OTHER PUBLICATIONS

Combined Chinese Office Action and Search Report dated Jan. 23, 2017 in Chinese Patent Application No. 201380014797.4 (with English language translation).
(Continued)

*Primary Examiner* — Ayaz Sheikh
*Assistant Examiner* — Debebe Asefa
(74) *Attorney, Agent, or Firm* — Oblon, McClelland, Maier & Neustadt, L.L.P.

(57) ABSTRACT

A determination apparatus for determining communication availability in an Orthogonal Frequency Division Multiplexing (OFDM) scheme communication system, the determination apparatus includes a reception unit configured to receive a wireless signal including an OFDM symbol in which a pilot signal is inserted at a constant interval in a frequency axis direction, an obtaining unit configured to obtain a discrete sample signal by sampling the wireless signal, a correlation value calculation unit configured to calculate a correlation value of the discrete sample signal for a time shift amount that is defined in advance according to the constant interval, and a determination unit configured to (Continued)

determine the communication availability in the communication system based on at least a result of determination whether the correlation value for the time shift amount has a peak or not.

7 Claims, 16 Drawing Sheets

(51) Int. Cl.
| | |
|---|---|
| *H04L 5/00* | (2006.01) |
| *H04L 27/00* | (2006.01) |
| *H04L 27/26* | (2006.01) |
| *H04W 52/02* | (2009.01) |

(52) U.S. Cl.
CPC ...... *H04L 27/0006* (2013.01); *H04L 27/2601* (2013.01); *H04L 27/2647* (2013.01); *H04W 52/0229* (2013.01); *H04W 52/0245* (2013.01); *Y02D 70/00* (2018.01); *Y02D 70/1222* (2018.01); *Y02D 70/1262* (2018.01); *Y02D 70/1264* (2018.01); *Y02D 70/142* (2018.01)

(56) References Cited

U.S. PATENT DOCUMENTS

| | | | |
|---|---|---|---|
| 2009/0052427 A1* | 2/2009 | Oketani | ............... H04L 27/261 370/347 |
| 2009/0103516 A1 | 4/2009 | Miyano et al. | |
| 2009/0257411 A1 | 10/2009 | Shitara | |
| 2009/0257427 A1 | 10/2009 | Shitara | |
| 2009/0323642 A1 | 12/2009 | Tanno et al. | |
| 2010/0157940 A1 | 6/2010 | Shitara | |
| 2011/0085612 A1 | 4/2011 | Muraoka et al. | |
| 2012/0033643 A1* | 2/2012 | Noh et al. | ..................... 370/335 |

FOREIGN PATENT DOCUMENTS

| | | |
|---|---|---|
| EP | 2 285 178 A1 | 2/2011 |
| JP | 2006 222665 | 8/2006 |
| JP | 2007 053741 | 3/2007 |
| JP | 2007 221743 | 8/2007 |
| JP | 2009 182989 | 8/2009 |

OTHER PUBLICATIONS

Extended European Search Report dated Oct. 26, 2015 in Patent Application No. 13764091.8.
3GPP TSG-RAN WG1#57b, R1-092797, "DL DM-RS Design for Rel-9 LTE", NTT, DOCOMO, pp. 1-8, (2009).
3GPP TSG-RAN WG1#57, R1-092017, "DM RS design for Dual Layer Beamforming", Ericsson, total pp. 4, (2009).
Fukuhara et al., "Channel Occupancy Estimation Method for wireless LAN", pp. 1163-1167, PIMRC, (2009).
3GPP TS 36.211, V10.4.0, "6.10 Reference signals", $3^{rd}$ Generation Partnership Project; Technical Specification Group Radio Access Network; Evolved Universal Terrestrial Radio Access (E-UTRA); Physical Channels and Modulation (Release 10), total pp. 2, (Dec. 2011).
JP Office Action of JP Application No. 2012-066269 dated Mar. 4, 2014 with English translation thereof.
International Search Report dated May 7, 2013 in PCT/JP13/054226 filed Feb. 20, 2013.

* cited by examiner

DETERMINATION APPARATUS FOR DETERMINING COMMUNICATION AVAILABILITY AND DETERMINATION METHOD

TECHNICAL FIELD

In order to cope with a rapid increase of data traffic in communication systems in recent years, there is a technology for enabling a user at a specific location to access multiple radio access networks 'RANs', achieving data traffic off-loading and improving communication capacity. For example, it may be considered that communication capacity is improved by providing a cell of a Long Term Evolution (LTE) scheme communication system (LTE system) in a cell of a third generation (3G) scheme communication system (3G system). Also, it may be considered a cell of wireless local area network (WLAN) scheme communication system (WLAN system) is provided in a cell of the LTE system. It can be expected that communication capacity is greatly improved by providing a multi-mode terminal that operates in two or more systems such as a 3G system, an LTE system, a WLAN system, etc., and by causing the multi-mode terminal to operate in a communication system that fits the communication environment of the terminal.

In order to effectively achieve the data traffic off-loading, a communication terminal must avoid a congested or busy RAN and it must be able to reliably find an available RAN. One of methods for finding an available RAN is a carrier-sense method or a power-detecting method. In the case of this method, the communication terminal determines whether a power level of a signal detected in a monitoring band is equal to or more than a threshold level and, based on the determination result, determines whether it can transmit a signal or not. This method is preferable from the viewpoint that the terminal can easily find a RAN, but is not preferable from the viewpoint of determination accuracy of whether there is a RAN or not because the power level varies according to fading, shadowing, etc.

In another method for a communication terminal to find an appropriate RAN, a base station of a communication system transmits, as notification information, information indicating congesting situations or busy situations to the communication terminal. In the case of this method, the terminal can accurately determine whether there is a non-congested RAN or not because the terminal does not need to rely on the received power level. This method is, however, not preferable from the viewpoint of battery energy consumption, etc., because the communication terminal needs to access the communication system to receive the notification information, to synchronize its clock with the communication system, and to demodulate the notification information. Also, in this method, the information indicating the congestion situation needs to be included in the notification information, and, in some cases, standard specifications of the communication system may need to be changed and it is not preferable from the viewpoint of easy realization. As for a technology for estimating wireless traffic, it is described in non-patent document 1, etc.

In yet another method for a communication terminal to find an appropriate RAN, Fast Fourier Transformation (FFT) is applied to received wireless signals and corresponding power at each of carrier frequencies is measured so that it is directly determined how much data traffic is included. Although this is a directly determining method, a process unit for applying FFT to the wireless signals must be activated and processing load becomes extremely heavy. Also, this method has a problem in accuracy because the power level varies according to fading, shadowing, etc., as described above. In this way, in the prior art, it is not easy for a communication terminal to accurately determine whether a RAN is available for communication while reducing its energy consumption.

RELATED ART DOCUMENT

Non-Patent Document 1

T. Fukuhara, et al., "Channel occupancy estimation method of Wireless Lan," PIMRC 2009

Non-Patent Document 2

3GPP TS36.211 "6.10 Reference signals"

SUMMARY OF THE INVENTION

Problem to be Solved by the Invention

Objective of the present invention is to determine accurately whether communication of a communication system is available or not while reducing energy consumption.

Means for Solving the Problem

A determination apparatus according to the present embodiment is a determination apparatus for determining communication availability in an Orthogonal Frequency Division Multiplexing (OFDM) scheme communication system. The determination apparatus include a reception unit configured to receive a wireless signal including an OFDM symbol in which a pilot signal is inserted at a constant interval in a frequency axis direction, an obtaining unit configured to obtain a discrete sample signal by sampling the wireless signal, a correlation value calculation unit configured to calculate a correlation value of the discrete sample signal for a time shift amount that is defined in advance according to the constant interval, and a determination unit configured to determine the communication availability in the communication system based on at least a result of determination whether the correlation value for the time shift amount has a peak or not.

Effect of the Present Invention

According to an embodiment of the present invention, it can be accurately determined whether communication of a communication system is available or not while reducing energy consumption.

EMBODIMENTS FOR CARRYING OUT THE INVENTION

Figure 1:
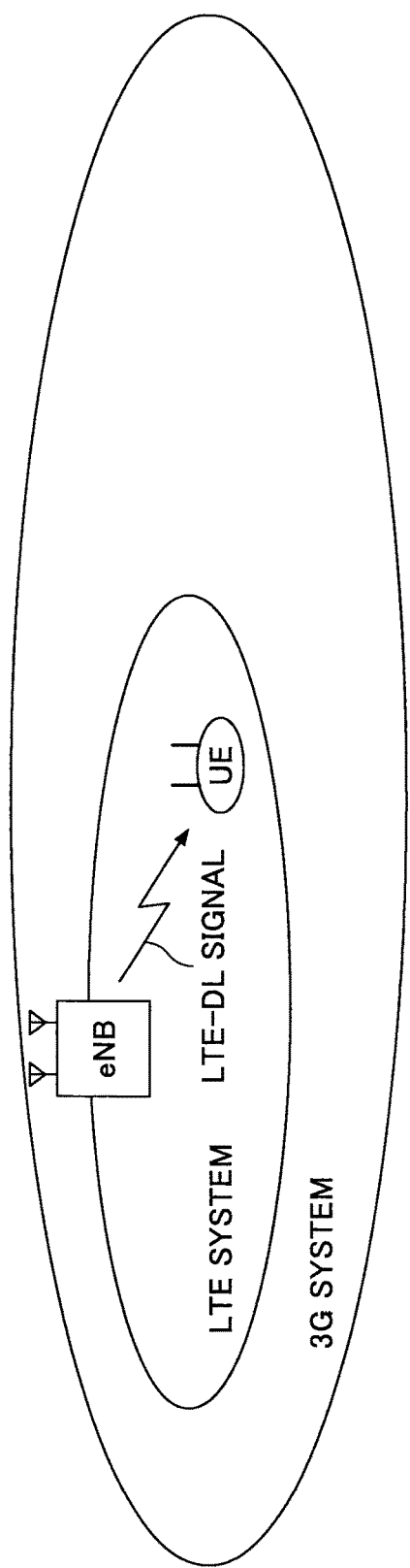
FIG. 1 is a drawing illustrating a communication system that can be used in an embodiment of the present invention.

Embodiments will be described from the following viewpoints referring to the accompanying drawings. In the figures, the same reference numbers or reference codes are given to the same elements.

1. Communication system
2. LTE-DL signal
3. Autocorrelation characteristics
4. Determination apparatus
5. Determination method
6. An example of a usage of the determination apparatus
6.1 A case where the determination apparatus is placed in a user apparatus
6.2 A case where the determination apparatus is placed outside of the user apparatus <1. Communication System>

FIG. 1 shows a communication system which can be used in an embodiment of the present invention. FIG. 1 shows that a cell of an LTE scheme communication system (LTE system) is provided in a cell of a 3G scheme communication system (3G system), and a communication terminal UE resides in a cell of the LTE system. The communication terminal UE is a dual mode terminal that can operate in both the 3G system and the LTE system. The communication terminal UE may further be a multi-mode terminal that can operate in three or more communication systems. A combination of communication systems is not limited to a combination of a 3G system and an LTE system but may be a combination of other systems. A communication terminal UE in an embodiment described below determines existence/non-existence and a degree of congestion of a communication system in which a known signal, such as a pilot signal, is included in a downlink signal at predefined frequency spacing. A typical example of such communication systems is an LTE scheme system or an advanced LTE scheme system. The communication terminal shown in the figure can operate in both the 3G system and the LTE system. As will be described below, the communication terminal determines whether it can communicate in the LTE system or not, or whether the LTE system is congested or not, and communicates in either the 3G system or the LTE system according to the determination result.

<2. LTE-DL Signal>

Figure 2:
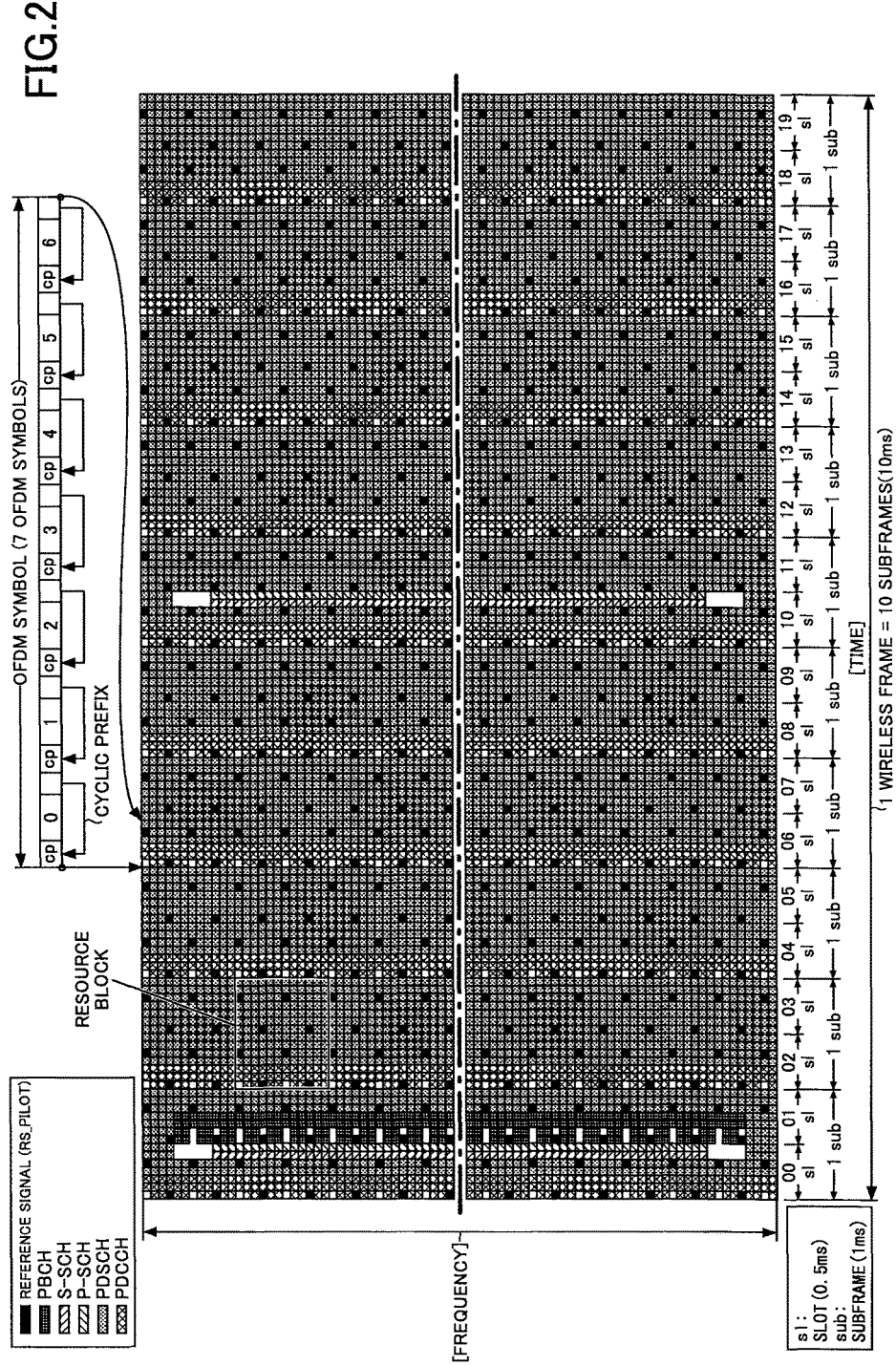
FIG. 2 is a drawing illustrating a format of a downlink signal in an LTE system.

FIG. 2 shows a format of a downlink signal that the communication terminal UE receives from a base station eNB in the LTE system. The downlink signal in the LTE system is communicated using Orthogonal Frequency Division Multiplexing (OFDM) scheme and forms a wireless frame that spreads across a certain system band width. There are several choices for the system band width depending on the base station (eNB) or the cell: specifically, choices from 1.4 MHz (6 of them), 3 MHz (15), 5 MHz (25), 10 MHz (50), 15 MHz (75) and 20 MHz (100). The figures in parentheses indicate the number of resource blocks whose band width is 180 kHz (12 subcarriers). The resource block is a unit for wireless resource assignment. A 10-ms wireless frame includes ten 1-ms subframes and one subframe includes two 0.5-ms slots. In one slot, 7 symbols (#0-6), for example, are included, and one symbol forms an OFDM symbol. The OFDM symbol includes a portion called a cyclic prefix (CP) or a guard interval, and the CP is formed as, for example, a repetition of the end of the effective OFDM symbol copied onto the top of the symbol.

The downlink signal is transmitted, one 1-ms subframe at a time. One to three OFDM symbols from the top of each subframe include a Physical Downlink Control CHannel PDCCH, and the PDCCH includes allocation information that indicates resources allocated to the user apparatus UE according to the scheduling for downlink and/or uplink. The OFDM symbols after the PDCCH in a subframe include control information or user data. In a case shown in the figure, the first subframe of the wireless frame (slots 00 and 01) includes a Primary Synchronization CHannel P-SCH, a Secondary Synchronization CHannel S-SCH, a Physical Broadcast CHannel PBCH and a Physical Downlink Shared CHannel PDSCH, and the PBCH is not included in other subframes. The P-SCH and the S-SCH are included in the first subframe (slot 00) and the fifth subframe (slot 10). Further, every first OFDM symbol of all slots of every 6th subcarrier and every fifth OFDM symbol of all slots of every 6th subcarrier includes a reference signal, RS-pilot. The reference signal is a known signal determined by a transmission side and a reception side in advance before starting communication, and may be called a pilot signal, a training signal, etc.

Generally, a reference signal RS-pilot is transmitted from the base station eNB regardless of whether there are user data or not. On the other hand, a signal that mainly carries user data, such as a Physical Downlink Shared CHannel PDSCH, is transmitted only in the case where there exist user data. In other words, the downlink signal always includes a reference signal but it does not always include user data.

Figure 3:
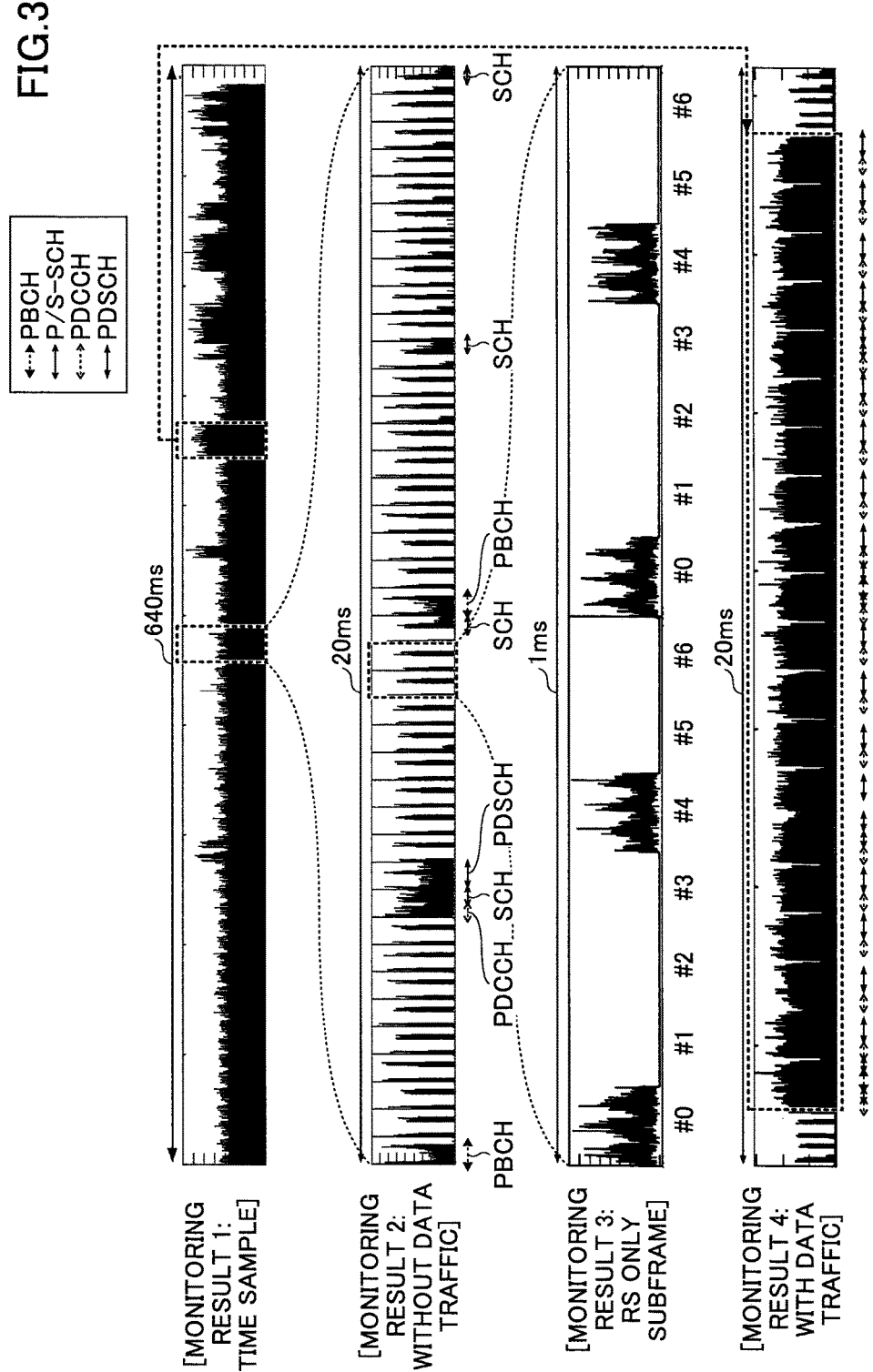
FIG. 3 is a drawing illustrating a monitoring result of the downlink signal of the LTE system.

FIG. 3 shows a monitoring result in a case where the user apparatus UE receives a downlink signal as shown in FIG. 2. For the sake of convenience, this user apparatus UE is supposed to reside near the base station eNB. The monitoring result 1 shown in FIG. 3 illustrates a time-domain sample in a case where the downlink signal is monitored for as long as 640 ms.

The monitoring result 2 shows a magnified portion of 20 ms of the monitoring result 1 (the portion where there is no data traffic).

The monitoring result 3 shows a magnified portion of 1 ms of the monitoring result 2. As described above, one subframe occupies a period of 1 ms, two 0.5-ms slots are included in this 1 ms, and each of the slots includes seven OFDM symbols. In the first (#0) and the fifth (#4) OFDM symbols, a reference signal (RS-pilot) is included regardless of whether there is data traffic or not. Therefore, in the monitoring result 3, the power level of the reference signal is not zero at the parts corresponding to the first (#0) and the fifth (#4) OFDM symbols of each of the slots. The power level is zero at other parts because there is no data traffic.

The monitoring result 4 shows a magnified portion of 20 ms of the monitoring result 1 (the portion where there is data traffic). As shown in the figure, the power level is always more than zero because of existence of data traffic. It is not shown in the figure but, if a portion of 1 ms of the monitoring result 4 is magnified like the monitoring result 3, the power level would be always more than zero because of the data traffic existence.

When the monitoring results 3 and 4 are compared, the monitoring results differ according to whether the data traffic exists or not. For example, in the case where a downlink signal received by a communication terminal UE, which has newly come to the LTE system, is as shown in the monitoring result 3, the data traffic signals are not transmitted and the LTE system is available so that the communication terminal UE may communicate. On the other hand, in the case where the downlink signal received by the communication terminal UE is as shown in the monitoring result 4, it is known that there exist data traffic signals being communicated and that the LTE system is not available or is congested. However, there is a possibility that the power levels shown in the monitoring results 3 and 4 may be subject to change due to fading or shadowing. Therefore, it is difficult for the user apparatus UE to accurately determine the availability of the LTE system merely based on the power level monitoring results as shown in the monitoring results 3 and 4.

In the present embodiment, the communication availability and a degree of congestion of the LTE system are easily and accurately determined, not based on the mere power level, but based on autocorrelation characteristics.

<3. Autocorrelation Characteristics>

In the meantime, when a signal of OFDM scheme is transmitted and received, a transmitter transforms transmission data into an effective symbol in the time-domain by applying Inverse Fast Fourier Transform 'IFFT' to the transmission data, and forms an OFDM symbol by adding a cyclic prefix to the effective symbol. A receiver receives this OFDM symbol and demodulates it into the transmission data by removing the cyclic prefix and by applying Fast Fourier Transform (FFT).

Figure 4:
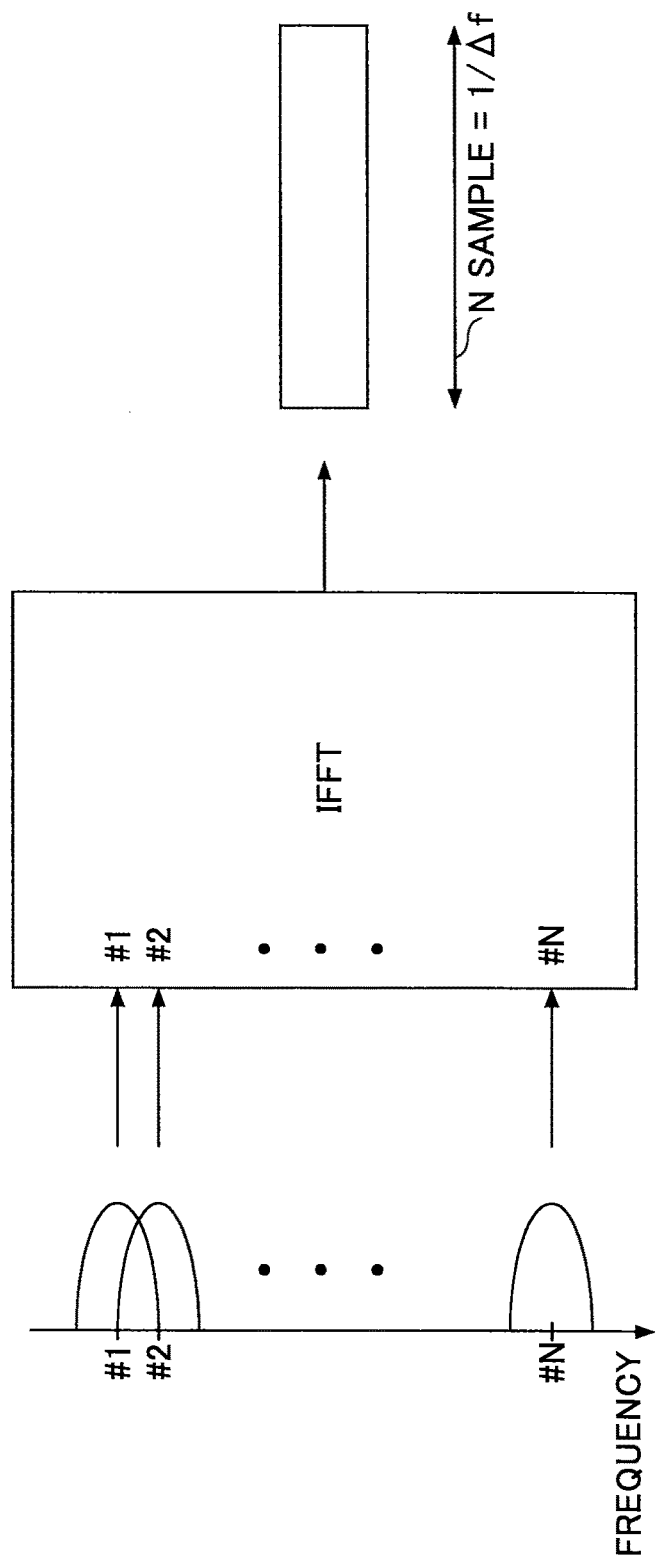
FIG. 4 is a drawing illustrating how IFFT is applied to non-periodic data.

Suppose that an effective symbol of as many as N time-domain samples is formed by applying Inverse Fast Fourier Transform IFFT to as many as N data items in the frequency domain as shown in FIG. 4. An OFDM symbol is formed by adding a Cyclic Prefix CP to this effective symbol. The Cyclic Prefix may be formed, for example, by adding a part of the end of the effective symbol to the top of the effective symbol, or, to the contrary, by adding a part of the top of the effective symbol to the end. A time length of the effective symbol of the N samples is $1/\Delta f$, where $\Delta f$ is a frequency spacing of as many as N data items to which IFFT is applied (subcarrier spacing).

Figure 5:
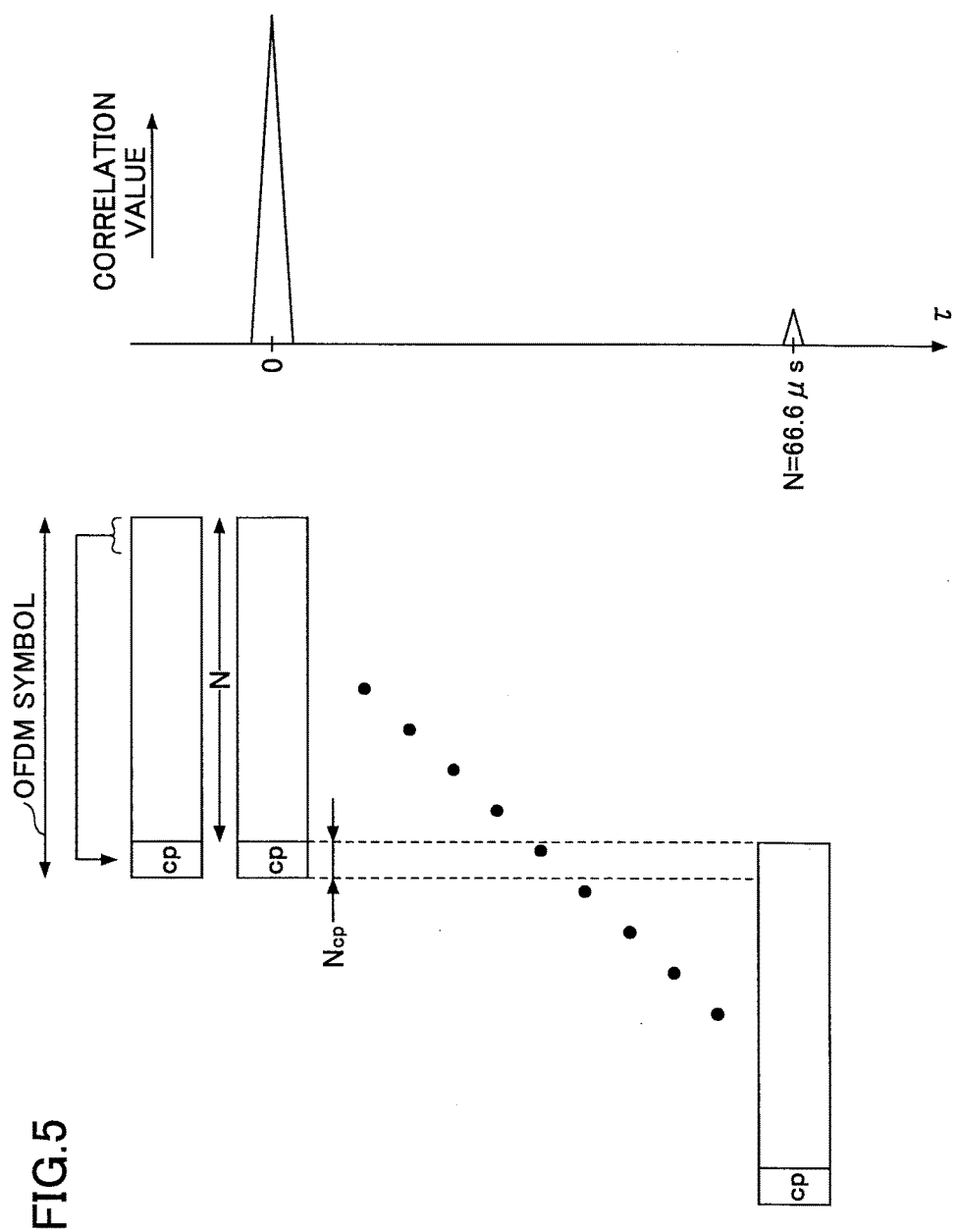
FIG. 5 is a drawing illustrating a relationship between an autocorrelation value and a time shift amount.

As shown in FIG. 5, an autocorrelation value of the OFDM symbols $R(\tau)=\Sigma s(t)s(t-\tau)$ has peaks in the case where the time shift amount equals to 0 and in the case where the $\tau$ equals to the effective symbol length N. $s(t)$ indicates the OFDM symbol in the time domain.

Figure 6:
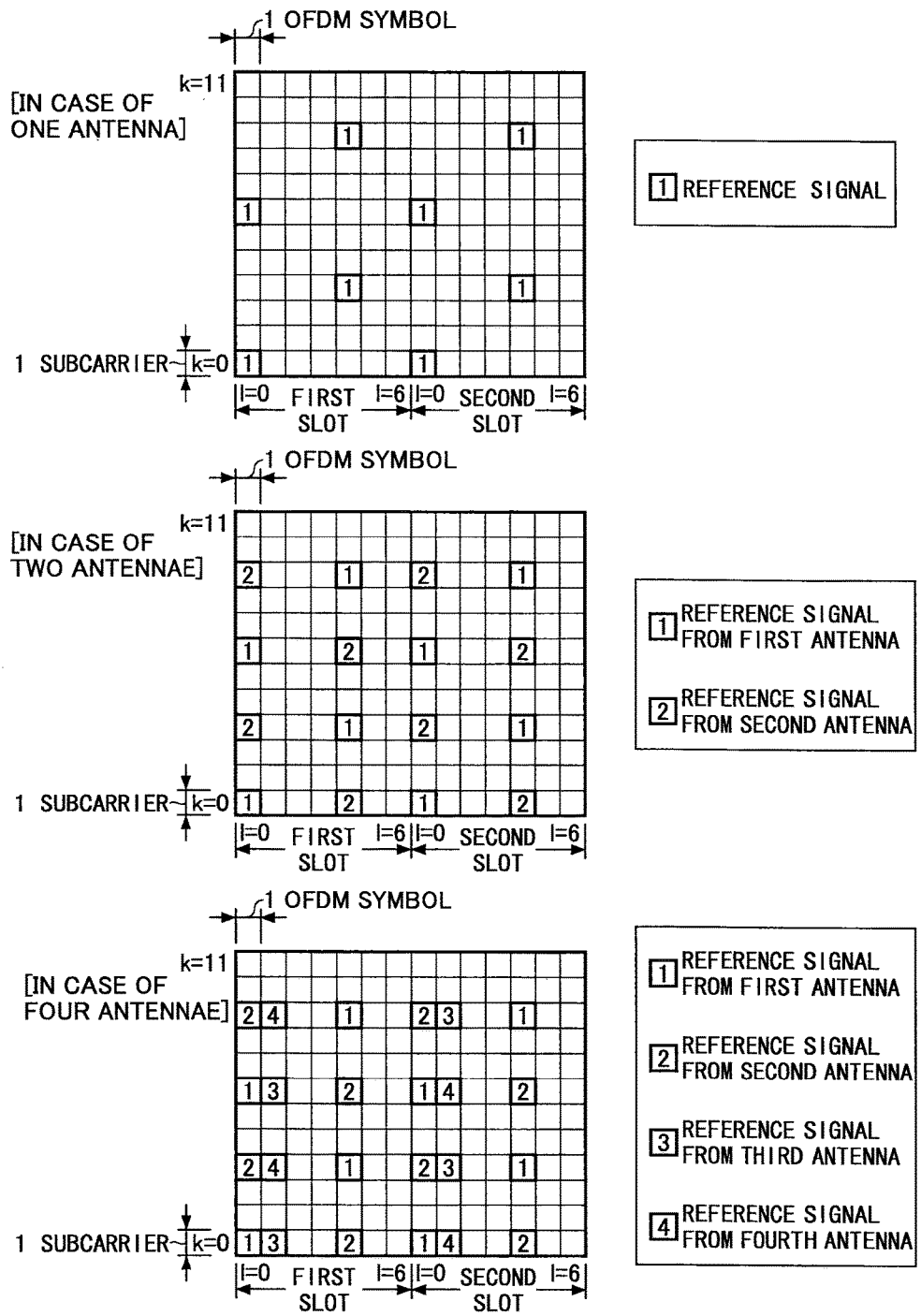
FIG. 6 is a drawing illustrating a mapping method of reference signals.

As described above, the reference signal is mapped to the downlink signal at a certain frequency spacing. FIG. 6 shows a specific example of a mapping method for the reference signal in one resource block (regarding this aspect, refer to, for example, non-patent document 2). In an example shown in the figure, mappings are shown for the cases where there is one transmission antenna, where there are two transmission antennae and where there are four transmission antennae. In the case where there is one transmission antenna (one antenna case), reference signals are mapped onto OFDM symbols of l=0 in each of slots for every 6th subcarrier and l=4 in each of slots for every 6th subcarrier. In the case where there are two transmission antennae (two antenna case), for each of the antennae, reference signals are mapped onto OFDM symbols of l=0 in each of slots for every 6th subcarrier and l=4 in each of slots for every 6th subcarrier. As a result, for the receiver, it looks as if reference signals are mapped onto OFDM symbols of l=0 and l=4 in each of slots for every 3rd subcarrier. In the case where there are four transmission antennae (four antennae case), as is shown in the figure, for each of the antennae, reference signals are mapped onto OFDM symbols of l=0 in each of slots for every 6th subcarrier, l=1 in each of slots for every 6th subcarrier, and l=4 in each of slots for every 6th subcarrier. For the receiver, it looks as if reference signals are mapped onto OFDM symbols of l=0, l=1 and l=4 in each of slots for every 3rd subcarrier. In any of the cases, control information or user data are mapped onto resource elements on which reference signals are not mapped. The resource element is a unit that is specified by the subcarrier and the OFDM symbol.

Therefore, in the one antenna case, for example, in the case where the LTE system is congested, the resource elements, on which no reference signal is mapped, are filled with the user data, the control signal, etc. On the other hand, in the case where the LTE system is not congested, especially in the case where no user data is included in the downlink signal, the downlink signal is to include, for example, only reference signals. For example, suppose that the LTE system is not congested and no user data is included in the downlink signal in the two antennae case in FIG. 6. In this case, of all OFDM symbols that the user apparatus UE receives, OFDM symbols of l=0 and l=4 in every 3rd subcarrier include reference signals and other resource elements include no data. Autocorrelation characteristics of this kind of OFDM symbols will be considered.

Figure 7:
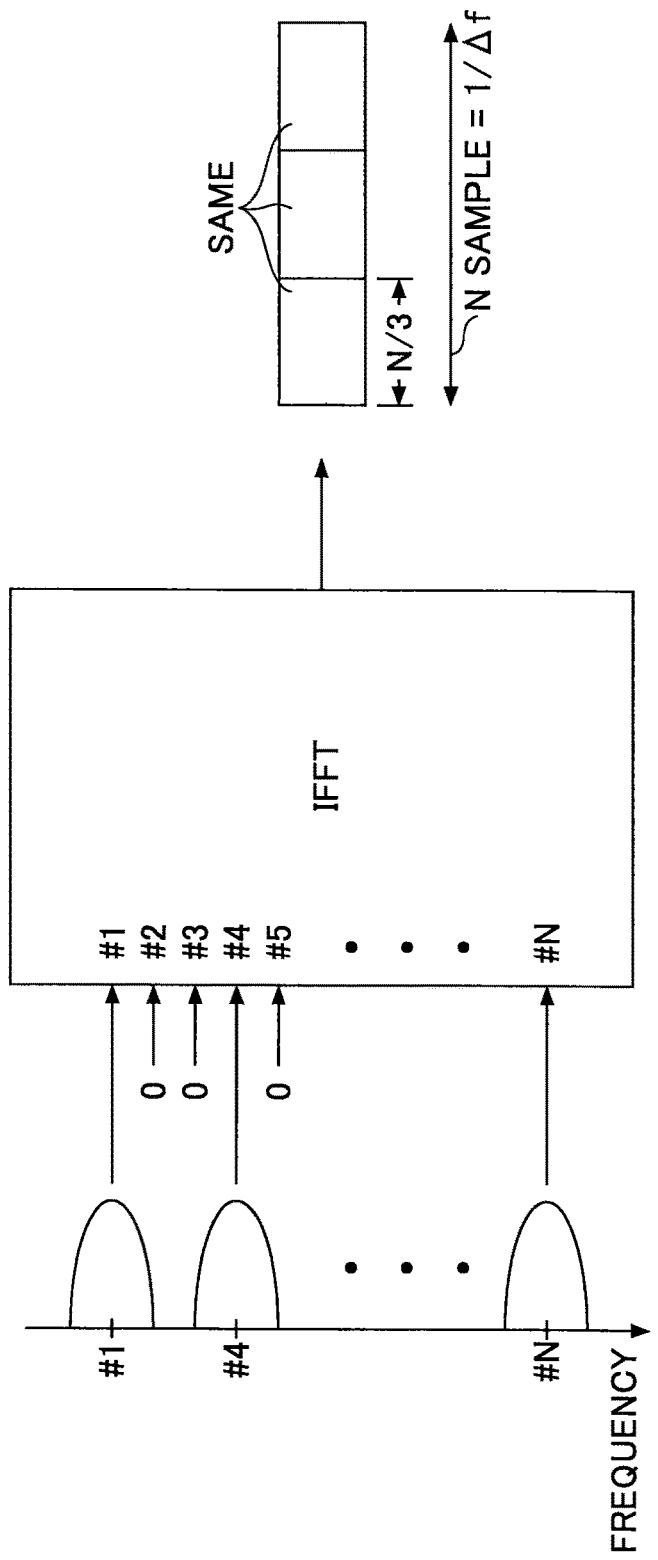
FIG. 7 is a drawing illustrating how IFFT is applied to periodic data.

FIG. 7 shows that, the same as FIG. 4, the effective symbol, which includes as many as N time-domain samples, is formed by applying Inverse Fast Fourier Transform to as many as N data items. Different from the case shown in FIG. 4, in the case of an example shown in FIG. 7, data are input for every 3rd subcarrier and no data is input for the remaining subcarriers. That is, of as many as N data items, one third of N data items include meaningful data and the remaining two thirds of N data items are zeros. In this case, the IFFT-applied effective symbol has a length of N samples (a period of $1/\Delta f$), and content of the effective symbol is equal to repetitions of one third portion of N samples. This is a result of the fact that, of as many as N data items, one third of N data items are meaningful data. Suppose, for example, as many as N data items, to which IFFT is applied, are data items as shown in the one antenna case in FIG. 6, in which reference signals are mapped in every 6th subcarrier; the effective symbol after IFFT is applied is an effective symbol in which one sixth portion of N samples is repeated for six times.

Figure 8:
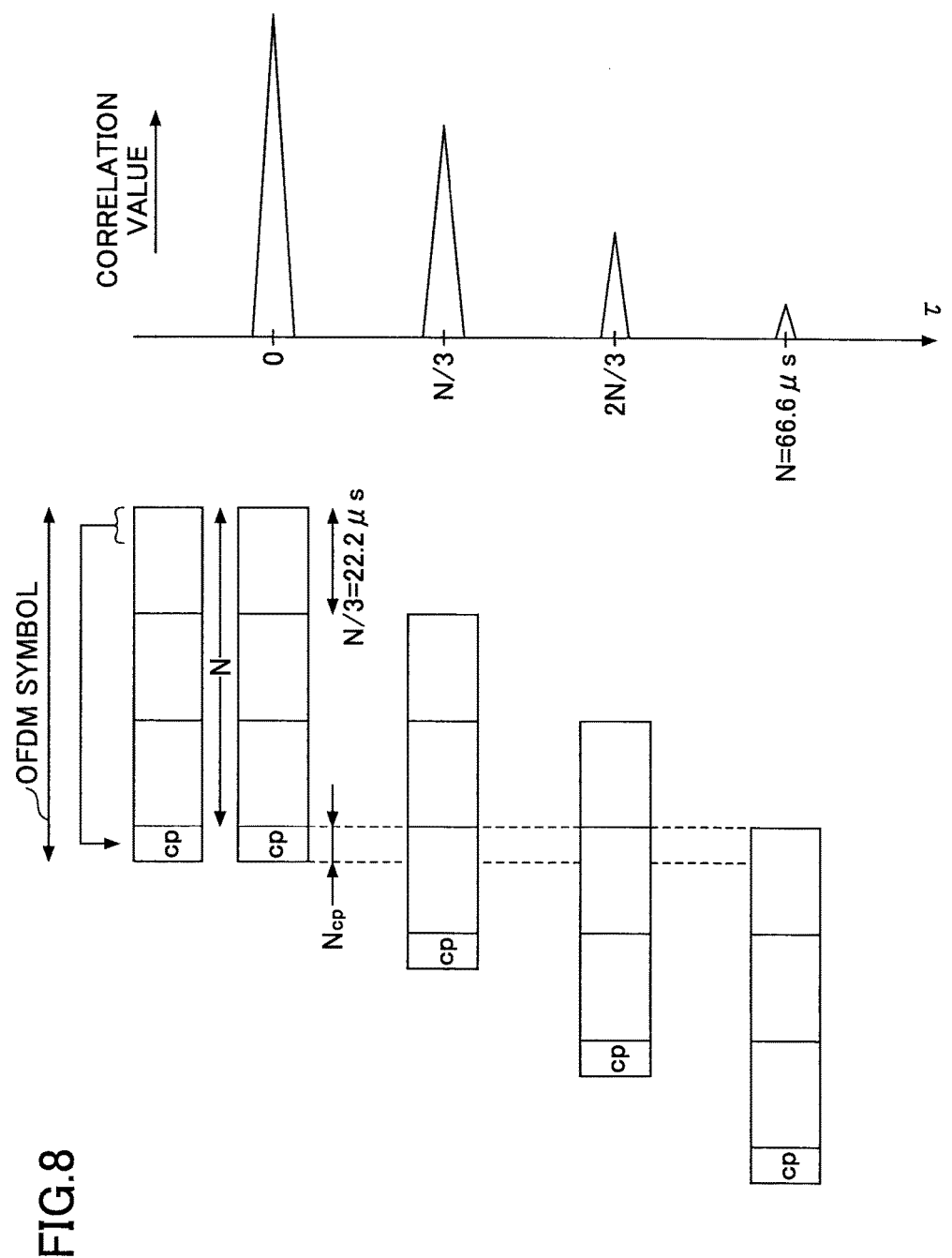
FIG. 8 is a drawing illustrating a relationship between the autocorrelation value and the time shift amount.

FIG. 8 shows autocorrelation characteristics for the OFDM symbol in the case where of as many as N data items, one third of the N data items are meaningful data. The autocorrelation value for the OFDM symbol of this case $R(\tau)=\Sigma\, s(t)s(t-\tau)$ has its peak, not only in the case where the time shift amount τ equals to zero and equals to the effective symbol length N, but also in the case where the time shift amount τ equals to N/3 and 2N/3. The reason is that the OFDM symbol has a structure in which a portion of N/3 samples is repeated. The s(t) indicates the OFDM symbol in the time domain.

The following will be understood by comparing FIG. 5 and FIG. 8. In the case where as many as N data items in the frequency domain correspond to the OFDM symbol, and reference signals are only inserted at a certain interval (the remaining data are zeros), the autocorrelation value of the OFDM symbol R(τ) has its peaks, not only at τ=0 and N, but also at τ=N/3 and 2N/3 which corresponds to the insertion interval of the reference signal (⅓) (refer to FIG. 8). On the other hand, in the case where as many as N data items in the frequency domain correspond to the OFDM symbol, and all data items are filled with meaningful data, the autocorrelation value of the OFDM symbol R(τ) has its peaks only at τ=0 and N. In this case, there are no peaks at τ=N/3 and 2N/3 which correspond to the insertion interval of the reference signal (⅓) (refer to FIG. 5).

Figure 9:
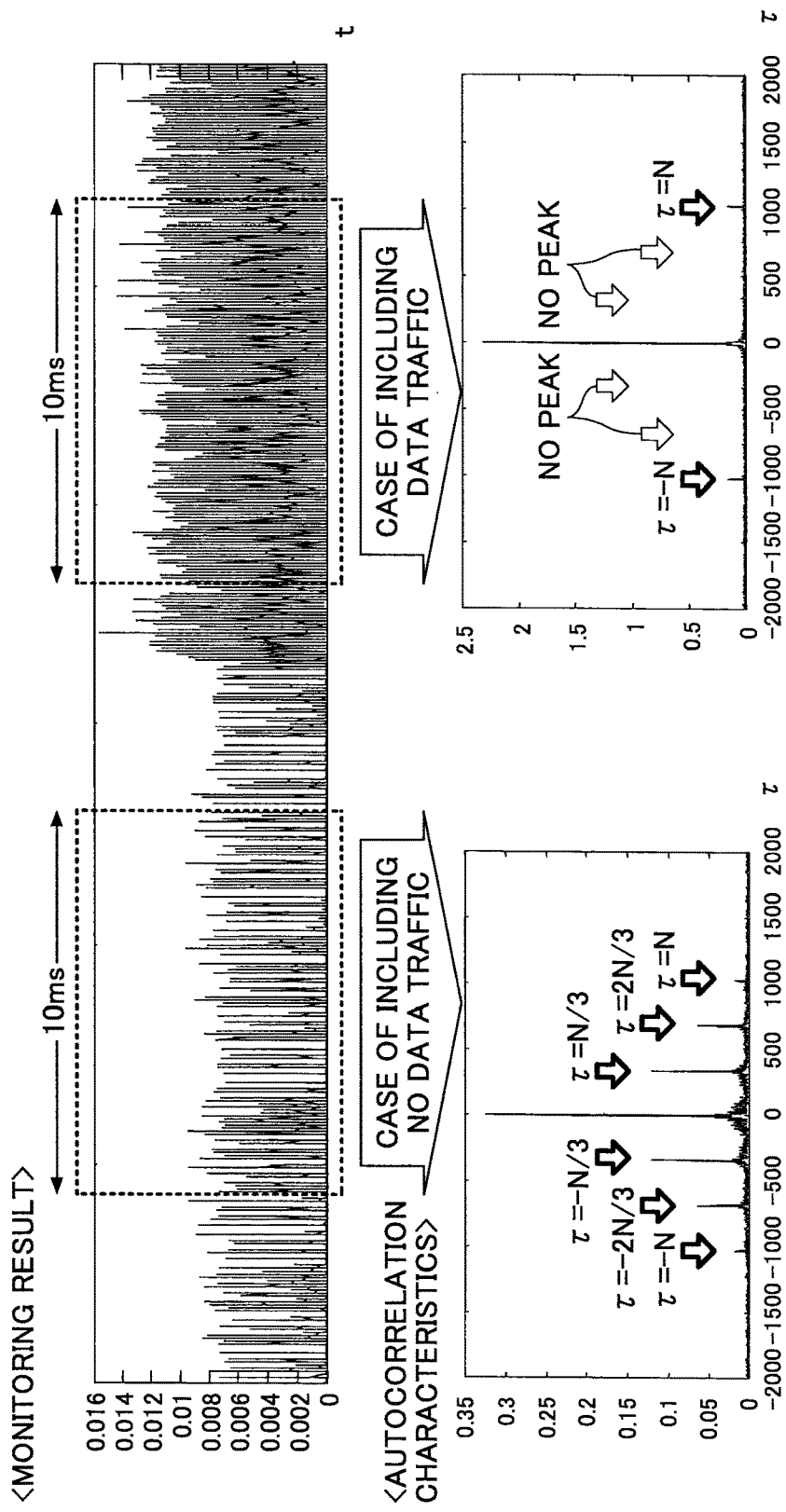
FIG. 9 is a drawing illustrating the monitoring result of the downlink signal in the LTE system and characteristics of the autocorrelation.

FIG. 9 shows a monitoring result of the downlink signal of the LTE system in the two antennae case in FIG. 6 (upper side of the figure) and autocorrelation characteristics of the OFDM symbol during a part of a period (lower side of the figure). The left side of the monitoring result in the user apparatus (UE) (upper side of the figure) shows that the power is low, which indicates a state in which there is no data traffic. The right side shows that the power is high, which indicates a state in which there is a lot of data traffic. As described above, these states may sometimes be determined by the monitored power level, but because the power level varies according to fading, etc., it is difficult to determine the state always and accurately. The lower side of FIG. 9 shows the autocorrelation characteristics of the OFDM symbol of portions of 10 ms in the case where there is no data traffic and in the case where there is data traffic. In the case shown in the figure, N=1024 samples (66.6 μs) is assumed. In the case where there is no data traffic, the peaks appear, not only at τ=0 and N, but also at τ=N/3 (about 341 samples) and 2N/3 (about 683 samples) due to the reference signals that are inserted in every 3rd subcarrier. On the other hand, in the case where there is data traffic, the peaks appear only at τ=0 and N. In the present embodiment, it is determined whether there is data traffic in the LTE system or not by using this kind of autocorrelation characteristics of the OFDM symbol.

Figure 10:
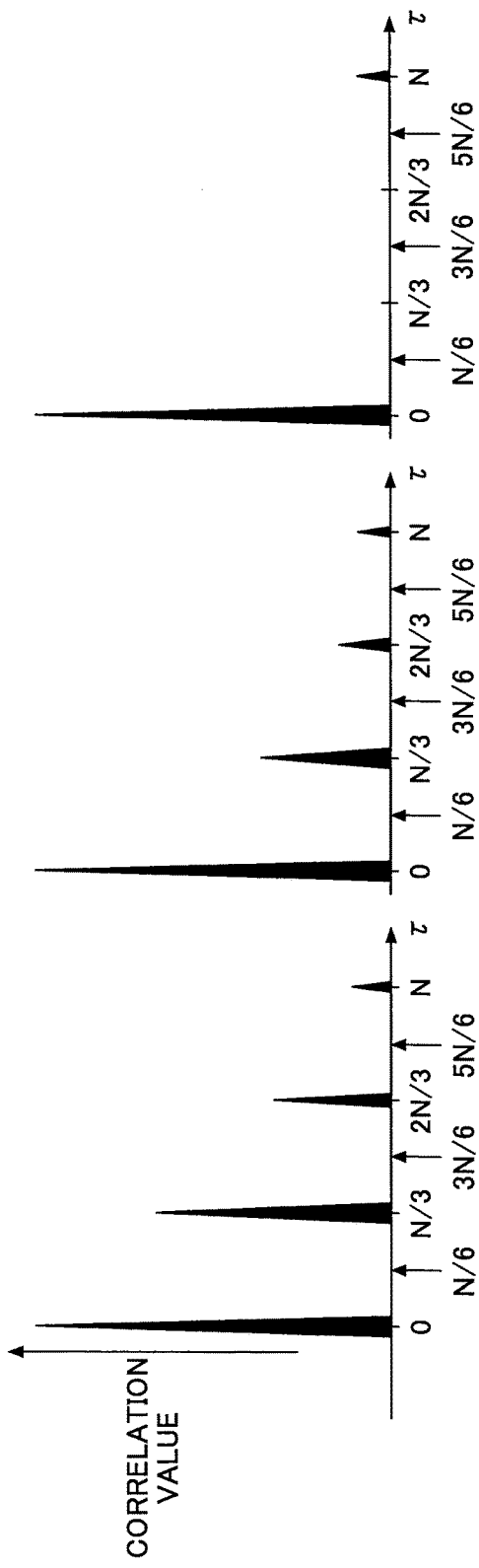
FIG. 10 is a drawing illustrating how heights of peaks change in accordance with a resource usage situation.

The drawing at left and below in FIG. 9 corresponds to the case where there is no data traffic and the drawing at right and below corresponds to the case where all of the resources for data traffic is occupied (no resource is available). If only half of the resources for data traffic is occupied, then the corresponding drawing would be something like a combination of the left-below drawing and the right-below drawing in which there would be smaller peaks than those in the left-below drawing at τ=N/3 and 2N/3, which is illustrated in FIG. 10. As shown in FIG. 10, the peaks appear at τ=N/3 and 2N/3, and their heights correspond to an occupation ratio or occupation situation of the resources that are available for the data traffic. Therefore, the resource availability or the degree of congestion of the resource can be estimated from the existence/non-existence of the peak, the peak's height, or from the peak's ratio at the predefined time shift amount. Note that in examples shown in the left-below drawing and the right-below drawing, the correlation value is not normalized. It is preferable that comparing the size of the peaks is performed using a normalized graph.

<4. Determination Apparatus>

Figure 11:
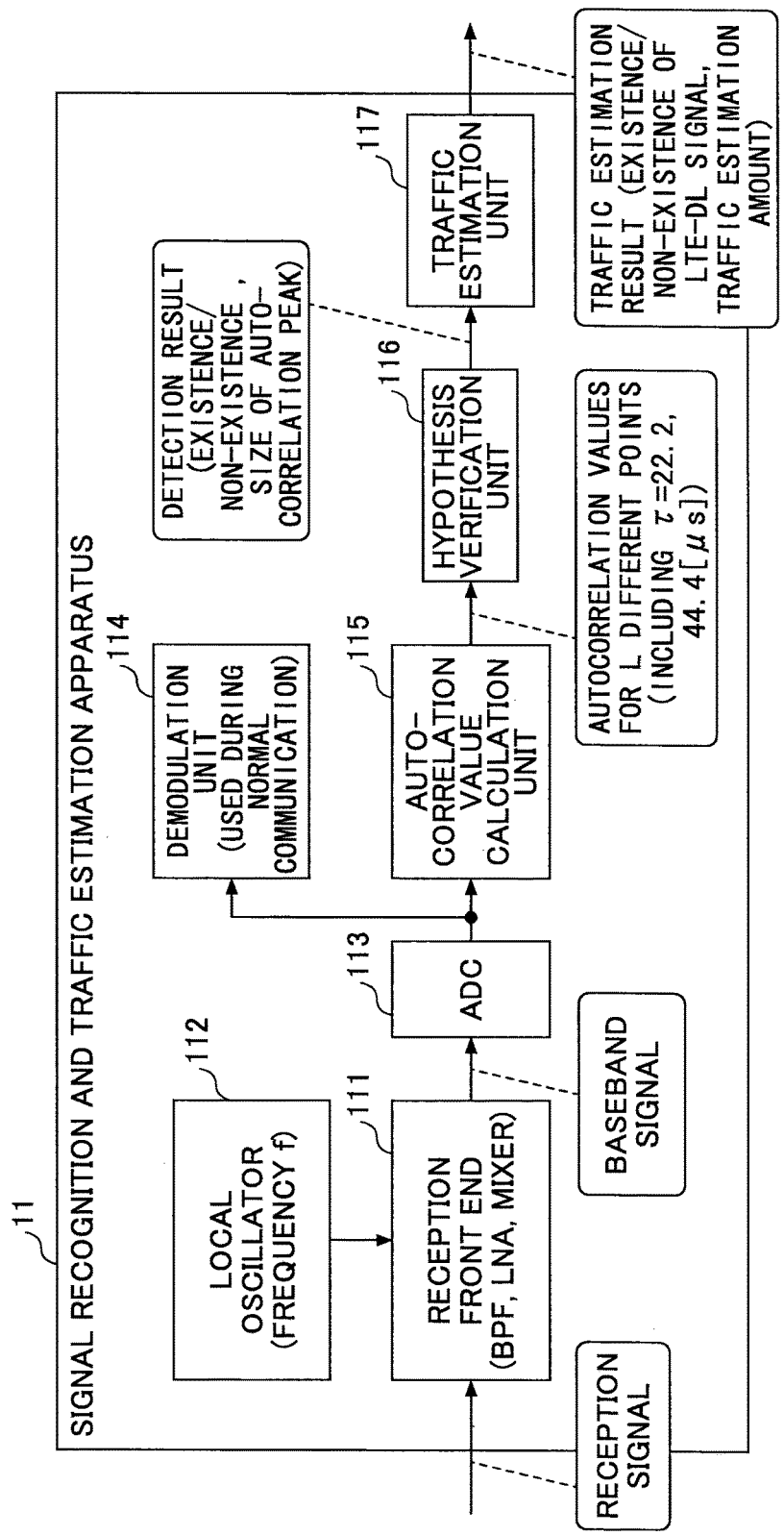
FIG. 11 is a drawing illustrating a determination apparatus used in the embodiment of the present invention.

FIG. 11 shows a signal recognition and traffic estimation apparatus 11 which is used as a determination apparatus in an embodiment of the present invention. The signal recognition and traffic estimation apparatus 11 may be placed in the user apparatus UE or placed outside of the user apparatus UE. In the case where it is placed outside of the user apparatus UE, the signal recognition and traffic estimation apparatus 11 and the user apparatus UE communicate with each other.

The signal recognition and traffic estimation apparatus 11 includes at least a reception front end 111, a local oscillator 112, an analog-digital converter (ADC) 113, a demodulation unit 114, an autocorrelation value calculation unit 115, a hypothesis verification unit 116 and a traffic estimation unit 117.

The reception front end 111, for example, receives a downlink signal of the LTE system and converts it into a baseband signal. The reception front end 111 includes elements such as a band path filter BPF, a low noise amplifier LNA and a mixer.

The local oscillator 112 provides a frequency signal which enables frequency conversion at the reception front end 111. As an example, an oscillation frequency of the local oscillator 112 is tuned to a carrier frequency of the reception signal.

The analog baseband signal converted by the reception front end 111 is sampled by the analog-digital converter (ADC) 113 and converted into discrete digital signals. As an example, the sampling frequency is 15.36 MHz and the effective symbol length of the OFDM symbol is 1024 samples (66.6 μs).

The demodulation unit 114 extracts the reference signal (RS-pilot), the synchronization signal (P-SCH, S-SCH), the control signal (PDCCH), the notification signal (PBCH), the data signal (PDSCH), etc., and performs demodulation and decoding.

The autocorrelation value calculation unit 115 calculates an autocorrelation value of the discrete sample signals at the predefined time shift amounts (as many as L points). The predefined L points are determined by insertion interval of the reference signal in terms of frequency direction and the effective symbol length of the OFDM symbol. For example, in the case where the reference signal is inserted in every 3rd subcarrier as shown in the two antennae case in FIG. 6, the insertion interval is ⅓. The effective symbol length is, as an example, N=1024 samples=66 μs. In this case, the time shift amount τ may be set to be values of Nm/3, the values calculated by multiplying the effective symbol length N by an integer multiple m of the insertion interval (⅓). Specifically, the settings are, for example, τ=0, N/3(=22.2 μs), 2N/3(44.4 μs), N(66 μs). These are the values of the time shift amount at which the peak appears in the case where there is no data traffic. Note that it is preferable that the time shift amount value, at which the autocorrelation value calculation unit 115 calculates the autocorrelation value of the discrete sample signal, not only includes the values at which the peak appears but also intentionally includes the values at which the peak does not appear. The reason is for comparing with the peaks. In an example above, as many as L time shift amounts may include τ=N/6, 3N/6 and 5N/6.

The hypothesis verification unit 116 determines whether there is a vacant resource available in the LTE system or not based on the values of as many as L time shift amounts calculated by the autocorrelation value calculation unit 115.

Specifically, of as many as L time shift amounts, the determination is made based on whether the peak appears or not at the time shift amount, at which the peak should appear in the case where there is no data traffic. In an example shown in FIG. 9, whether or not there is a vacant resource available may be determined based on whether or not the peaks appear at τ=N/3 and 2N/3.

The traffic estimation unit 117 estimates to what extent vacant resources are available in the case where it is determined by the hypothesis verification unit 116 that there are vacant resources available, or in the case where, of all resources for data traffic, not all of the resources are occupied. As described referring to FIG. 10, the peaks appear at L points (for example, at τ=N/3 and 2N/3) and the heights of the peaks correspond to the occupation ratio of the resources that are used for data traffic. Therefore, the situation of vacant resources is estimated based on the peaks (specifically, the existence/non-existence of the peak, the height of the peak or the ratio of the peak) at these time shift amounts. In FIG. 11, the estimation result is reported to a processing unit (not shown), and a corresponding operation is performed. Specifically, in the case where there are sufficient vacant resources available, the signal recognition and traffic estimation apparatus 11 determines that the user apparatus UE may start communication using the LTE system and prompts the user apparatus UE to access the LTE system. In the case where, to the contrary, there are not sufficient vacant resources available, the signal recognition and traffic estimation apparatus 11 determines that the user apparatus UE should not start communication using the LTE system and does not let the user apparatus UE access the LTE system.

<5. Determination Method>

Figure 12:
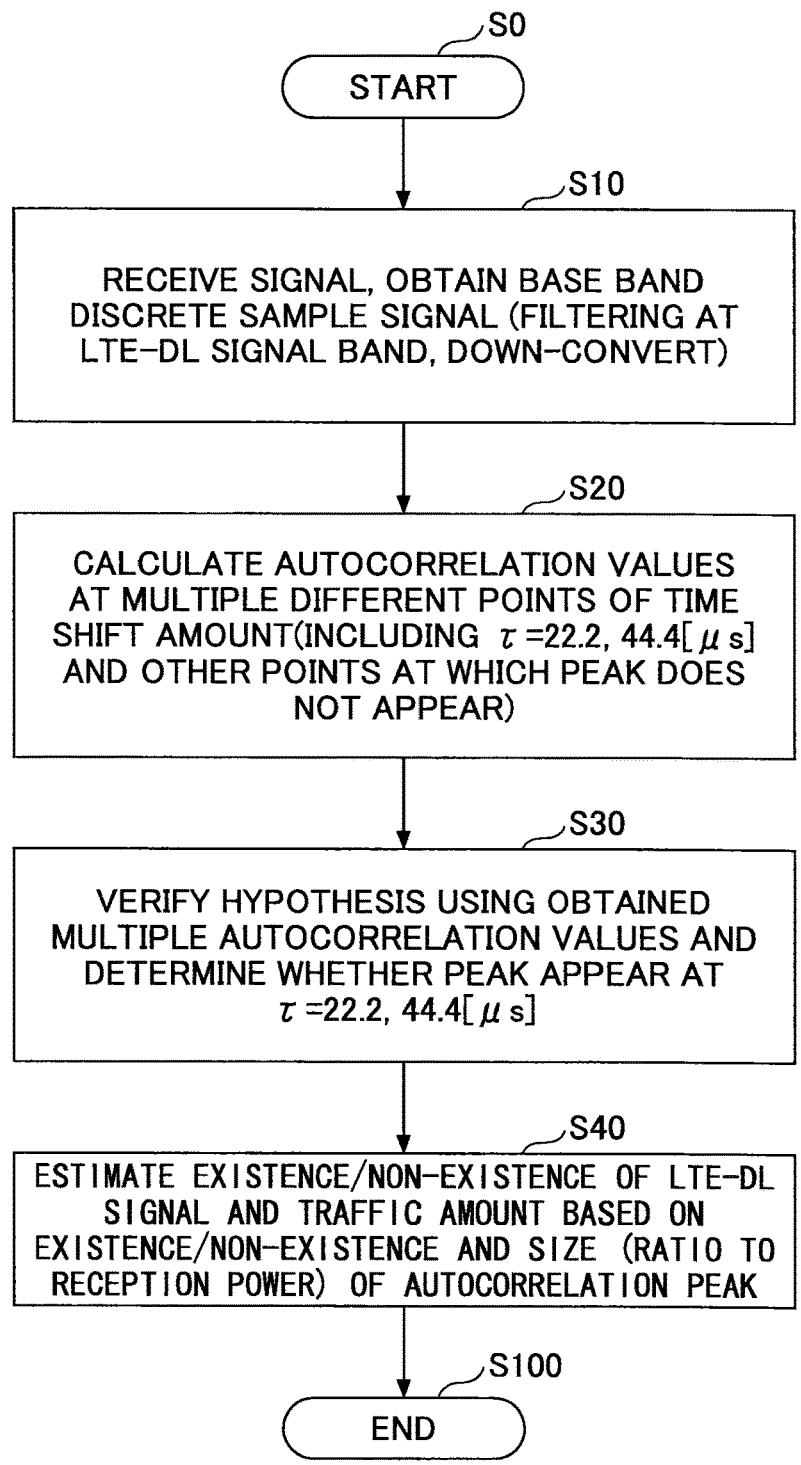
FIG. 12 is a flowchart illustrating a determination method used for signal recognition and by a traffic estimation apparatus.

FIG. 12 shows a flowchart illustrating a determination method used by the signal recognition and traffic estimation apparatus 11 shown in FIG. 11. The flow starts at step S0 and moves to step S10.

In step S10, the signal recognition and traffic estimation apparatus 11 receives the downlink signal from the base station eNB of the LTE system. The received signal, after being converted to a baseband analog signal, is converted to a baseband digital signal, or a discrete sample signal.

In step S20, the signal recognition and traffic estimation apparatus 11 calculates autocorrelation values of discrete sample signals at several predefined time shift amounts (τ=22.2 µs, etc.)

In step S30, the signal recognition and traffic estimation apparatus 11 determines whether the peak of the autocorrelation value of the discrete sample signal appears.

In step S40, the signal recognition and traffic estimation apparatus 11 estimates the situation of vacant resources in the LTE system based on the existence/non-existence of the peak and the height of the peak, and causes the user apparatus UE to operate in accordance with the estimation result.

<6. An Example of a Usage of the Determination Apparatus>

The signal recognition and traffic estimation apparatus 11 as a determination apparatus may be placed in the user apparatus UE or outside of the user apparatus UE. The user apparatus UE is typically a mobile phone, but it can be another apparatus. For example, the user apparatus may be, but not limited to, an information terminal, an advanced mobile phone, a smart phone, a tablet-type computer, a personal digital assistant (PDA), a portable personal computer, a palmtop computer, a laptop computer, a desktop computer, etc.

<<6.1 A case Where the Determination Apparatus is Placed in the User Apparatus UE>>

Figure 13:
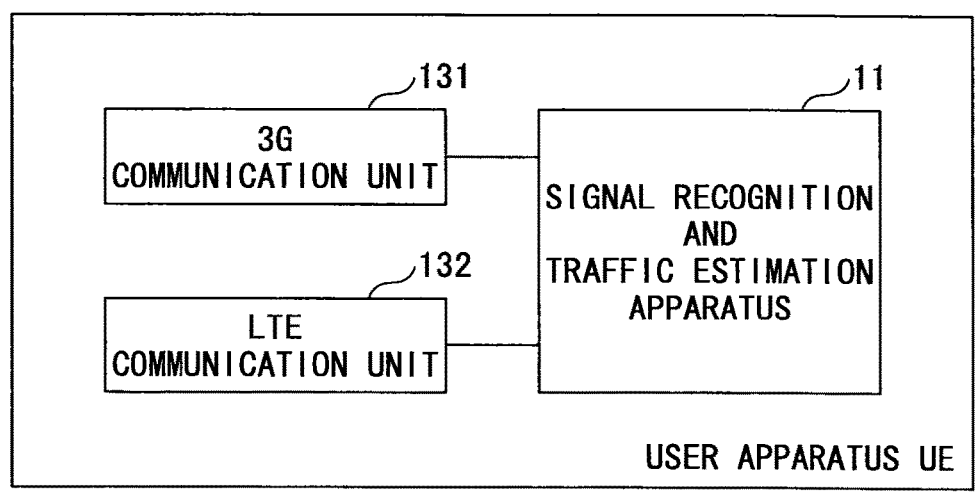
FIG. 13 is a functional block diagram illustrating a case where the signal recognition and traffic estimation apparatus is not included in a user apparatus UE.

FIG. 13 is a functional block diagram illustrating a case where the signal recognition and traffic estimation apparatus 11 shown in FIG. 12 is included in the user apparatus UE. The user apparatus UE includes, in addition to the signal recognition and traffic estimation apparatus 11, a 3G communication unit 131 and an LTE communication unit 132.

The signal recognition and traffic estimation apparatus 11 is configured and operates as described referring to FIG. 11 and FIG. 12.

The 3G communication unit 131 has a function to transmit/receive communication signals in an LTE scheme communication system and to process the transmission/reception signals.

The LTE scheme communication system is, for example, but not limited to, a WCDMA scheme communication system, a GSM scheme communication system, etc.

Figure 14:
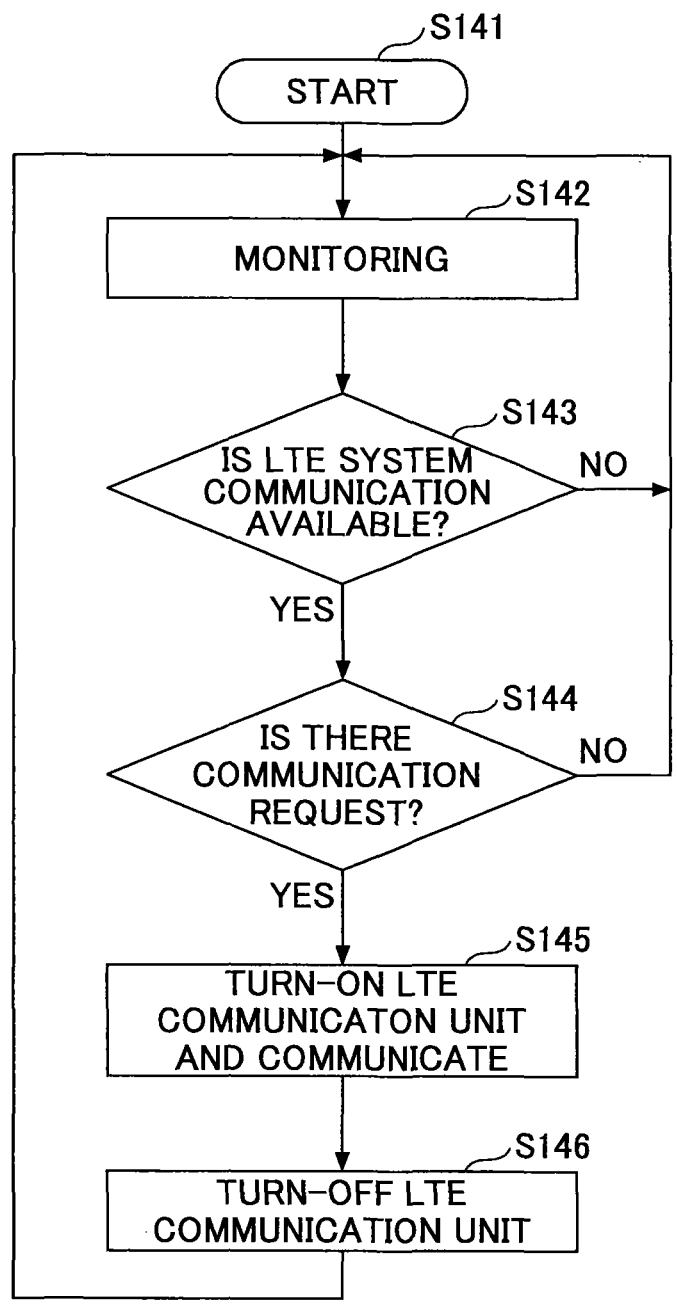
FIG. 14 is a flowchart illustrating an example of operations in an embodiment shown in FIG. 13.

FIG. 14 is a flowchart illustrating an example of operations in the user apparatus UE shown in FIG. 13. The flow starts from step S141 and moves to step S142.

In step S142, the signal recognition and traffic estimation apparatus 11 monitors downlink signals in the LTE system.

In step S143, the signal recognition and traffic estimation apparatus 11 determines whether it can communicate in the LTE system. Specifically, the signal recognition and traffic estimation apparatus 11 receives downlink signals from the LTE system, calculates the autocorrelation value for the discrete sample signal at each of the L predefined time shift amounts, and determines whether it can communicate in the LTE system based on the peaks (existence/non-existence of the peaks, the height of the peaks and/or the ratio of the peaks) of the autocorrelation value of the discrete sample signal. In the case where the communication is not available (for example, in the case where there is no available vacant resource), the flow returns to step S142. In the case where the communication is available, the flow moves to step S144.

In step S144, the user apparatus UE determines whether a user requests to communicate. In the case where the user does not request to communicate, the flow returns to step S142. In the case where the user requests to communicate, the flow moves to step 145.

In step S145, the user apparatus UE turns the switch of the LTE communication unit 132 from OFF to ON, and performs the requested communication in the LTE system.

In step S146, the user apparatus UE turns the switch of the LTE communication unit 132 from ON to OFF, and the flow returns to step S142.

<<6.2 A Case Where the Determination Apparatus is Placed Outside of the User Apparatus UE>>

Figure 15:
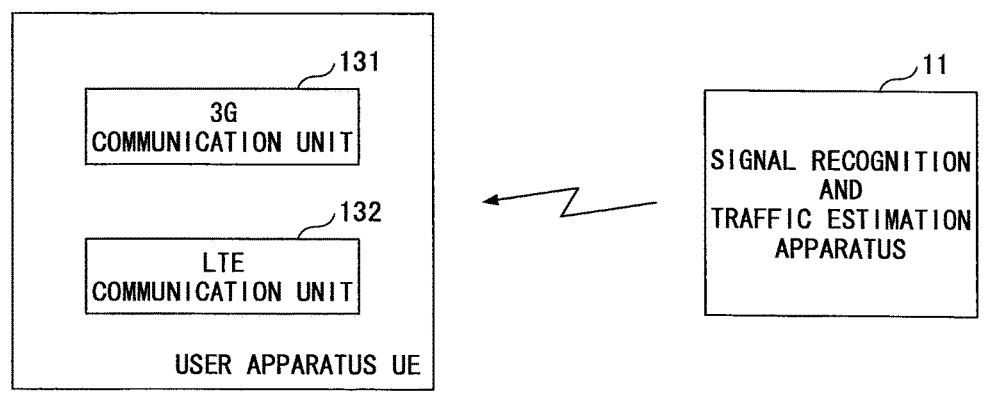
FIG. 15 is a functional block diagram illustrating a case where the signal recognition and traffic estimation apparatus is placed outside of the user apparatus UE.

FIG. 15 is a functional block diagram illustrating a case where the signal recognition and traffic estimation apparatus 11 is placed outside of the user apparatus UE. Functions of the signal recognition and traffic estimation apparatus 11, of the 3G communication unit 131 and of the LTE communication unit 132 are basically the same as those described referring to FIG. 13, and the duplicated descriptions are omitted. In the case of this embodiment, both the signal recognition and traffic estimation apparatus 11 and the user apparatus UE have a communication interface for communicating with each other. This communication interface may be a wired communication interface or a wireless communication interface. The signal recognition and traffic estimation apparatus 11 may be a peripheral device or an accessory of the user apparatus UE, or an access point placed in a location where it can communicate with the user apparatus UE.

Figure 16:
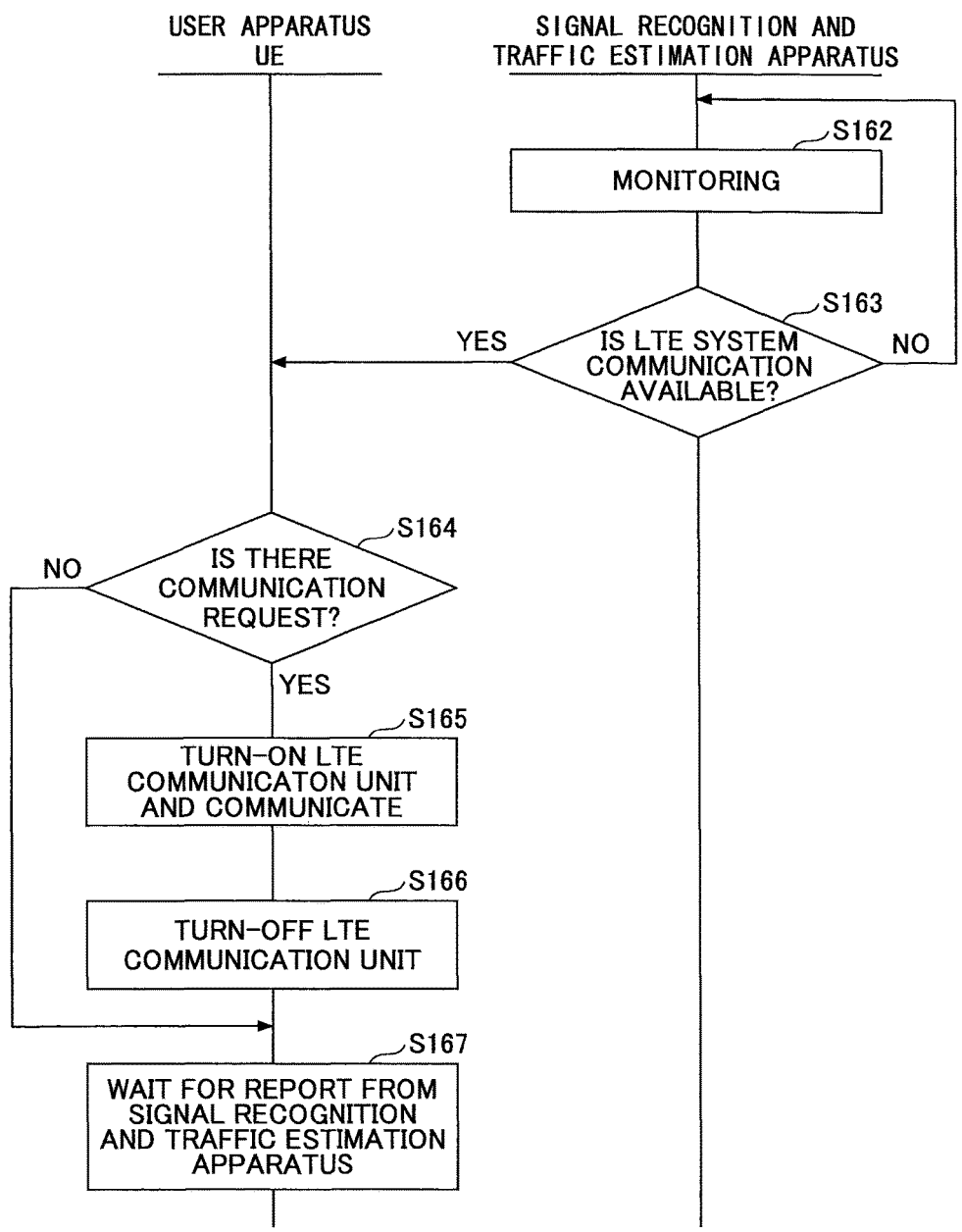
FIG. 16 is a flowchart illustrating an example of operations in an embodiment shown in FIG. 15.

FIG. 16 is a flowchart illustrating an example of operations in the embodiment shown in FIG. 15.

In step S162, the signal recognition and traffic estimation apparatus 11 monitors downlink signals in the LTE system.

In step S163, the signal recognition and traffic estimation apparatus 11 determines whether it can communicate in the LTE system. In the case where the communication is not available (for example, in the case where there is no vacant resource), the flow returns to step S162. In the case where the communication is available, the signal recognition and traffic estimation apparatus 11 reports the same to the user apparatus UE and the flow moves to step S164.

In step S164, the user apparatus UE determines whether the user requests to communicate. In the case where the user requests to communicate, the flow moves to step S165.

In step S165, the user apparatus UE turns the switch of the LTE communication unit 132 from OFF to ON, and performs the requested communication in the LTE system.

In step S166, the user apparatus UE turns the switch of the LTE communication unit 132 from ON to OFF.

In the case where the user does not request to communicate in step S164, or in the case where the switch of the LTE communication unit 132 is turned to OFF in step S166, the user apparatus UE, in step S167, waits for the next report from the signal recognition and traffic estimation apparatus 11.

According to the embodiment of the present invention, whether or not the LTE system is available can be determined by calculating the autocorrelation value of the wireless signal or the discrete sample signal of the wireless signal. Therefore, the present embodiment is preferable from the viewpoint that the determination is more accurate compared to the conventional method in which the carrier is detected based on the power level alone. Furthermore, the period required for detecting the LTE system is not limited to a short subframe period such as 1 ms, and the detection can be made based on received signals during 10 ms or any period. And, by making the monitoring period longer, influence of noise can be reduced. Furthermore, not only existence/non-existence of the data traffic in the LTE system but also to what extent the data traffic is used can be easily and accurately estimated from the size of the peak value.

According to the embodiment of the present invention, the LTE communication unit 132 is activated in the case where the downlink signal of the LTE system is monitored and the LTE system is available for communication plus there is a request for communication from the user; and can be deactivated in the remaining case. It should be noted that it is not required to activate the LTE communication unit 132 for determining whether the LTE system is available. The reason is that it is not required to perform the LTE scheme demodulation process for calculating the autocorrelation values of the wireless signal or of the discrete sample signal of the wireless signal corresponding to the L time shift amounts. Therefore, the method according to the present embodiment is especially advantageous from the viewpoint of reducing the battery energy consumption.

According to the embodiment of the present invention, whether the LTE system is available or not can be determined by calculating the autocorrelation values of the wireless signal or of the discrete sample signal of the wireless signal corresponding to the L time shift amounts. If the computing amount required for calculating one autocorrelation value is X, then the computing amount required for calculating autocorrelation values corresponding to L time shift amounts is only L*X. On the other hand, if Fast Fourier Transformation is applied to the downlink signal of the LTE system, the LTE system availability situation and the congestion situation can be directly known. But in this case, Fast Fourier Transformation must be applied to the downlink signal and it must be studied how the signal is mapped onto the time and frequency domain. In this case, at least computing amount of $X\log(X)$ for processing the FFT, or in general, as much as computing amount of $X^2$ is required, and the computing load becomes extremely heavy compared to the present embodiment in which the computing amount is only $L*X$ ($<<X^2$).

A determination apparatus and a determination method for determining communication availability have been described according to the embodiments. The present invention is not limited to the above embodiments and various modifications and improvements are available within the scope of the present invention. For example, the present invention may be applied to any situation for detecting a communication system in which a pilot signal is inserted at a certain interval in the frequency axis direction. For the sake of convenience, the present embodiments are described using specific numbers in order to facilitate understanding of the invention, but these numbers are used just as examples and, unless otherwise noted, any appropriate number can be used. For the sake of convenience, the present embodiments are described using specific mathematical expressions in order to facilitate understanding of the invention, but these mathematical expressions are used just as examples and, unless otherwise noted, other mathematical expressions that can produce the same results may be used. Division of embodiments or items is not essential for the present invention, and things described in two or more items may be used in combination as necessary, or a thing described in an item may be applied to a thing described in a different item (as long as it does not conflict). Borders of function units or processing units in functional block diagrams do not necessarily correspond to borders of physical components. Operations of multiple function units may be performed in one physical component, or operations of one function unit may be performed by multiple physical components. For the sake of convenience, devices of the present embodiments are described using a functional block diagram, but those devices may be realized as hardware, software, or combination of both. The software may be provided in a Random Access Memory (RAM), a Flash memory, a Read-Only Memory (ROM), an EPROM, an EEPROM, a register, a hard disk (HDD), a removable disk, a CD-ROM, a database, a server, or any other memory media. The present invention is not limited to the above embodiments, and various variations and modifications may be made without departing from the spirit of the present invention.

The present application is based on and claims the benefit of priority of Japanese Priority Application No. 2012-066269 filed on Mar. 22, 2012, the entire contents of which are hereby incorporated by reference.

DESCRIPTION OF THE REFERENCE NUMERALS

11 Signal recognition and traffic estimation apparatus
111 Reception front end
112 Local oscillator
113 Analog-digital converter
114 Demodulation unit
115 Autocorrelation value calculation unit 116 Hypothesis verification unit
117 Traffic estimation unit

The invention claimed is:

1. An apparatus for determining communication availability in a communication system that is based on an Orthogonal Frequency Division Multiplexing (OFDM) scheme, the apparatus comprising:
a communication interface configured to receive a wireless signal including an OFDM symbol in which a pilot signal is inserted at a constant interval in a frequency axis direction; and
circuitry configured to
obtain a single discrete sample signal by sampling the wireless signal;
calculate autocorrelation values of the single discrete sample signal of the received wireless signal for time shift amounts that are defined in advance according to the constant interval according to an equation $R(\tau)=\Sigma s(t)s(t-\tau)$, where s(t) indicates the OFDM symbol in the time domain and T indicates the time shift amount, based on the result of the estimating, based on characteristics of Inverse Fast Fourier Transform and autocorrelation in which (1) the OFDM symbol is based on a symbol of as many as N time-domain samples formed by applying Inverse Fast Fourier Transform to as many as N data items and, in a case where one third of the N data items include non-zero data, content of the symbol is equal to repetitions of one third portion of the N time-domain samples, and in a case where one sixth of the N data items include non-zero data content of the symbol is equal to repetitions of one sixth of N time-domain samples; and, (2) in the case where the content of the symbol is equal to repetitions of one third portion of N time-domain samples, autocorrelation value for the OFDM symbol has its peak, not only in the case where the time shift amount is equal to zero and equal to N, but also in the case where the time shift amount is equal to N/3 and 2N/3; and
determine the communication availability in the communication system based on at least a result of determination whether the autocorrelation value for the time shift amount has a peak or not, wherein
where a first autocorrelation value of the single discrete sample signal for a first time shift amount equal to N/3 has a first peak and a second autocorrelation value of the single discrete sample signal for a second time shift amount equal to 2N/3 has a second peak, the circuitry is further configured to estimate a situation of vacant resources, which is a degree of congestion of resources, from a ratio between the first peak and the second peak, determine to start communication using the communication system and prompt a user apparatus to access the communication system in a first case where there are sufficient vacant resources available based on a result of the estimating, and determine not to start communication and not permit the user apparatus an access to the communication system in a second case where there are not sufficient vacant resources available,
wherein a choice for the time shift amount that is defined in advance includes a value calculated by multiplying one period of the OFDM symbol by an integer multiple of the constant interval at which the pilot signal is inserted in the frequency axis direction.

2. The apparatus as claimed in claim 1, wherein the choice for the time shift amount includes, in addition to the value calculated by multiplying one period of the OFDM symbol by the integer multiple of the constant interval, a value that is different from the value calculated by multiplying one period of the OFDM symbol by the integer multiple of the constant interval.

3. The apparatus as claimed in claim 1, wherein regarding at least one OFDM symbol, a first pilot signal transmitted from one antenna is spaced apart from a second pilot signal transmitted from another antenna by a frequency spacing corresponding to the constant interval.

4. The apparatus as claimed in claim 1, wherein the communication system is a communication system based on Long Term Evolution (LTE) scheme or LTE-Advanced scheme.

5. The apparatus as claimed in claim 1, wherein the apparatus is included in the user apparatus.

6. The apparatus as claimed in claim 1, wherein the apparatus is included in an apparatus different from the user apparatus.

7. A method for determining communication availability in a communication system that is based on an Orthogonal Frequency Division Multiplexing (OFDM) scheme, the method comprising:
receiving a wireless signal including an OFDM symbol in which a pilot signal is inserted at a constant interval in a frequency axis direction,
obtaining a single discrete sample signal by sampling the wireless signal,
calculating autocorrelation values of the single discrete sample signal of the received wireless signal for time shift amounts that are defined in advance according to the constant interval according to an equation $R(\tau)=\Sigma s(t)s(t-\tau)$, where s(t) indicates the OFDM symbol in the time domain and $\tau$ indicates the time shift amount, based on the result of the estimation, based on characteristics of Inverse Fast Fourier Transform and autocorrelation in which (1) the OFDM symbol is based on a symbol of as many as N time-domain samples formed by applying Inverse Fast Fourier Transform to as many as N data items and, in a case where one third of the N data items include non-zero data, content of the symbol is equal to repetitions of one third portion of the N time-domain samples, and in a case where one sixth of the N data items include non-zero data, content of the symbol is equal to repetitions of one sixth portion of N time-domain samples; and, (2) in the case where the content of the symbol is equal to repetitions of one third portion of N time-domain samples, autocorrelation value for the OFDM symbol has its peak, not only in the case where the time shift amount is equal to zero and equal to N, but also in the case where the time shift amount is equal to N/3 and 2N/3, and
determining the communication availability in the communication system based on at least a result of determination whether the autocorrelation value for the time shift amount has a peak or not, wherein
determining the communication availability includes, in a case where a first autocorrelation value of the single discrete sample signal for a first time shift amount equal to N/3 has a first peak and a second autocorrelation value of the single discrete sample signal for a second time shift amount equal to 2N/3 has a second peak, estimating a situation of vacant resources, which is a degree of congestion of resources, from a ratio between the first peak and the second peak, and to start communication using the communication system and prompt a user apparatus to access the communication system in a first case where there are sufficient vacant resources available based on a result of the estimating, and not to start communication and not permit the user apparatus an access to the communication system in a second case where there are not sufficient vacant resources available, wherein a choice for the time shift amount that is defined in advance includes a value calculated by multiplying one period of the OFDM symbol by an integer multiple of the constant interval at which the pilot signal is inserted in the frequency axis direction.

* * * * *